United States Patent [19]

Sekizawa

[11] Patent Number: 4,916,549
[45] Date of Patent: Apr. 10, 1990

[54] IMAGE SENSING APPARATUS WITH SHADING COMPENSATION

[75] Inventor: Hidekazu Sekizawa, Kanagawa, Japan

[73] Assignee: Kabushiki Kaisha Toshiba, Kawasaki, Japan

[21] Appl. No.: 211,266

[22] Filed: Jun. 24, 1988

[30] Foreign Application Priority Data

Jun. 24, 1987 [JP] Japan .................................. 62-155383

[51] Int. Cl.$^4$ ............................................... H04N 1/40
[52] U.S. Cl. .................................... 358/461; 358/163; 358/443
[58] Field of Search ................ 358/163, 443, 448, 461, 358/471

[56] References Cited

U.S. PATENT DOCUMENTS

| | | | |
|---|---|---|---|
| 4,523,229 | 6/1985 | Kanmoto | 358/461 |
| 4,760,464 | 7/1988 | Sakano | 358/461 |
| 4,806,780 | 2/1989 | Yamamoto et al. | 358/461 |

FOREIGN PATENT DOCUMENTS

| | | |
|---|---|---|
| 57-152268 | 9/1982 | Japan . |
| 57-173259 | 10/1982 | Japan ................................... 358/461 |

OTHER PUBLICATIONS

Thomas G. Stockham, Jr., "Image Processing In The Context Of A Visual Model", *Proceedings Of The IEEE*, vol. 60, No. 7, Jul. 1972, pp. 828–842.

T. R. Little, "Real Time Digital Correction Of Acquisition Errors Applied To Solid State Scanners", *SPIE*, vol. 119 *Application Of Digital Image Processing (IOCC, 1977)*, pp. 172–181.

*Primary Examiner*—James J. Groody
*Assistant Examiner*—Randall S. Svihla
*Attorney, Agent, or Firm*—Oblon, Spivak, McClelland, Maier & Neustadt

[57] ABSTRACT

An image sensing apparatus with shading compensation is provided such that an object to be sensed is moved with respect to light sensing elements and the same point of the object is sensed by different light sensing elements, whereby shading compensation information can be obtained. When a white reference board is used as the object, despite non-uniformity in brightness of the white reference board, uniform image sensing signals with proper shading compensation can be obtained independent of variations in sensitivity of the light sensing elements.

9 Claims, 4 Drawing Sheets

IMAGE SENSING APPARATUS WITH SHADING COMPENSATION

BACKGROUND OF THE INVENTION

1. Field of the Invention

This invention relates to an image sensing apparatus using plural light sensors, and more particularly to an image sensing apparatus with shading compensation in that variations in the sensitivity of the light sensors and variations in the intensity of illumination are compensated.

2. Description of the Prior Art

Hitherto, an image sensing apparatus with shading compensation has been described in Japanese Patent Application No. 54-32013. In this apparatus, both black-level signals and white-level reference signals produced from light sensors are stored in a memory. The shading compensation is performed by the use of these stored signals. The black level signals correspond to output signals of the light sensors when no light is input thereto. This state can be readily created by simply turning off the light source, or by covering the light sensors whereby substantially no light may be introduced. Thus, the black level signals can be obtained relatively easily. Conversely, in order to produce white level reference signals, a white reference board having a uniform reflection factor is necessary. However, an ideal reference board is difficult to obtain. Nevertheless, an original document sensing scanner or the like generally has a white reference board incorporated within an image sensing system. By using the board, the white level reference signals can be obtained selectively as data for shading compensation. These data can be used to compensate for variations in brightness, such as light-quantity distribution noise that varies over time, called shading noise. However, such a white reference board occasionally becomes dirty. When the board is dirtied, this dirtiness becomes indistinguishable from variations in sensitivity of the light sensors. Thus, shading compensation cannot be achieved. Further, in a camera used in an enclosed area, such as the human stomach or the like, it is practically impossible to obtain uniform white reference signals necessary to perform shading compensation because of foreign substances accumulating on the camera.

As described above, in the conventional image sensing apparatus with shading compensation, there have been problems in that uniform white reference signals are very difficult to obtain. Thus, it is difficult to distinguish between variations in sensitivity of the light sensors and variations of white reference signals. As a result of this, proper shading compensation cannot be achieved consistently.

SUMMARY OF THE INVENTION

Accordingly, one object of this invention is to provide an image sensing apparatus with shading compensation that can perform proper shading compensation independent of shading noise in the image sensing system even when uniform white reference signals cannot be obtained.

Briefly, in accordance with one aspect of this invention, there is provided an image sensing apparatus with shading compensation which comprises means for optically sensing an image of an object by use of light sensors constituted by plural light sensing elements, means for relatively moving the object and the sensing means, processing means for obtaining shading compensation information by use of image signals sensed with different light sensing elements from the same point of the object before and after movement thereof performed by the moving means, and means for storing the thus obtained shading compensation information.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
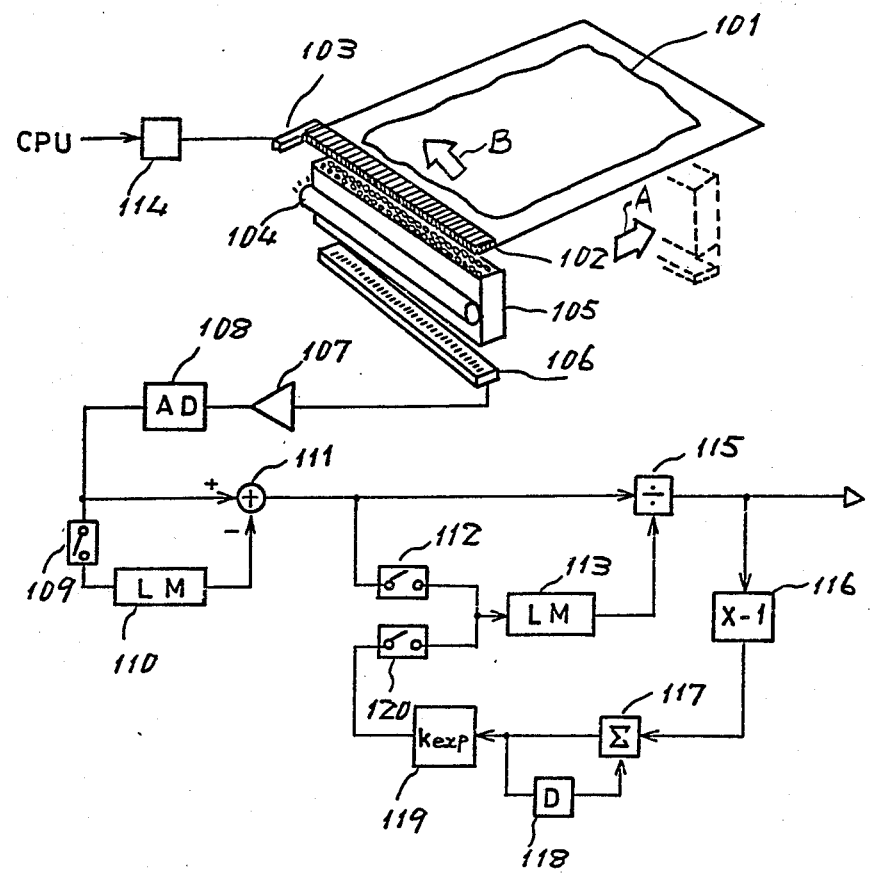
FIG. 1 is a block diagram illustrating a first embodiment of the present invention.

In accordance with the present invention, when an object is moved, the same point of the object can be sensed by different light sensing elements before and after the movement of the object. The differences of signal values sensed by different light sensing elements with respect to the same point of the object can be used as variations in sensitivity of the different light sensing elements alone. The thus obtained variations in the sensitivity of the light sensing elements are stored in a memory. If shading compensation is performed by using these stored variations, proper shading compensation can be achieved even when the object (white reference board) is not uniform in brightness (reflection factor).

When the object is sensed while moving in the direction of arrangement of plural light sensing elements, the identical light sensing element can sense the object before and after the movement of the object. These signals are produced from the identical light sensing elements, so that they exclude variations in sensitivity of the light sensing elements. Namely, these signals can be used as variations in brightness of the object (white reference board). This idea can be furthered and repeated throughout the plural light sensing elements with respect to their individual output signals. Thus, uniform image sensing signals with proper shading compensation can be obtained with no effect from variations of sensitivity in light sensing elements and variations in brightness of the object (white reference board).

Referring now to the drawings, wherein like reference numerals designate identical or corresponding parts throughout the several views, and more particularly to FIG. 1 thereof, a first embodiment of this invention will be described.

FIG. 1 shows an example when this invention is applied to a monochrome original document sensing apparatus. First, the operations thereof will be described. Then the principle thereof will be described. Prior to sensing an original document 101, a white reference board 102 is sensed. The board 102 is connected to an actuator 103 constituted by piezoelectric elements, such as bimorph. Thus, the board 102 is movable in a direction (shown by arrow B) perpendicular to the direction of sensing the original document 101 (shown by arrow A). Light emitted from a light source 104 impinges on the white reference board 102, and reflects therefrom. The reflected light focuses an image of the board 102 on a line light sensor 106 through a focusing element 105. This image is converted to electrical signals by the line light sensor 106. These electrical signals are amplified by an amplifier 107, and converted to digital signals by an AD converter 108. Prior to turning on the light source 104, a black level signal from the line light sensor 16 is stored. In order to store this black level signal in a line memory 110, a gate switch 109 is turned ON.

Next, the gate switch 109 is turned OFF, and the light source 104 is turned on, then the white reference board 102 is sensed as follows. The signals obtained per pixel by the line light sensor 106 are fed into an adder 111 together with the black level signal, which is simultaneously read from the line memory 110. The adder 111 subtracts this black level signal from the signals obtained by the line light sensor 106. In the case where the black level signal from the line light sensor 106 exhibits no variation, i.e., 0, this subtraction of the black level signal becomes unnecessary. A gate switch 112 is turned ON, so that these signals obtained after compensation of the black level signal are stored in a line memory 113. Next, a CPU (central processing unit, not shown) causes a driver 114 to drive the actuator 103 so as to move the white reference board 102 by the amount of one single pixel of the line light sensor 106. In this state, the white reference board 102 is sensed again. Also, in this case the black level signal is read from the line memory 110 so as to perform black level compensation. This procedure can obtain signals having no offset.

Now, the gate switch 112 is turned off, and the data of the white reference board before the movement thereof (stored in the line memory 113) are read. These data and the data after movement of the board are fed into a divider 115 so as to obtain a ratio of the data before and after the movement of the board. The divider 115 may be constituted by a look-up table using a ROM (read-only memory) or the like. This signal of the ratio is converted by a first table ROM 116 into data for shading compensation processing. The thus converted data are fed through an adder 117 into a latch 118, and stored temporarily therein. In this manner, the data are successively stored in the latch 118, and these data are added by the adder 117. These data are converted by a second table ROM 119 into signals. These converted signals, which will be later described in detail, accurately represent variations in sensitivity of the sensing system alone, even when the white reference board is dirty. A gate switch 120 is turned ON, and these signals are fed into the line memory 113, and stored therein. This procedure is performed after that the data of the white reference board before the movement thereof are read from the line memory 113. As described above, information on variations in sensitivity of the sensing system alone is stored in the line memory 113.

Next, an arrangement which comprises the light source 104, the focusing element 105, and the line light sensor 106 is moved in the direction of arrow A so as to sense the original document 101. The thus sensed signals are compensated by the signals which are read from the line memory 110 in terms of black-level offset compensation. These compensated signals are further compensated by information on variations in sensitivity and shading, which is read from the line memory 113 in terms of shading compensation.

Figure 2A:
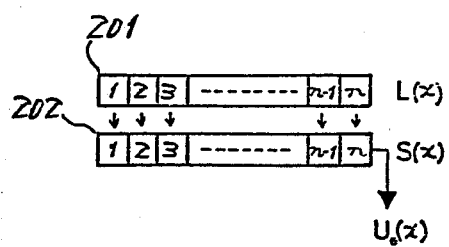
FIGS. 2A and 2B are diagrams for explaining the operating principles of the present invention.
Figure 2B:
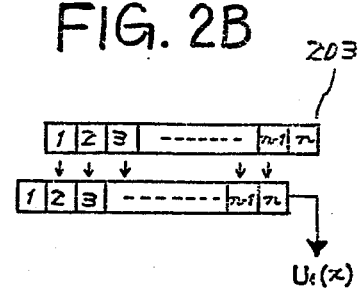

As described above, even when the white reference board 102 is dirtied, information on variations in sensitivity of the sensing system along can be stored in the line memory 113. This principle will be described hereinafter. FIGS. 2A and 2B show the sensing system simplified for explaining information derived therefrom. In FIG. 2A, 201 represents information L(x) on variations in brightness of the white reference board alone. Reference numeral 202 represents shading noise S(x) of both the illumination system and the sensing system, including variations in sensitivity of the sensors. FIG. 2B shows the case where only the white reference board 102 is moved by a distance of Δx. In the case of FIG. 2A, an output signal $U_0(x)$ will be as follows:

$$U_0(x) = L(x) \cdot S(x) \tag{1}$$

Next, in the case of FIG. 2B, if consideration is centered on the white reference board 102, it could be considered that the sensors are moved. Thus, an output signal $U_1(x)$ will be as follows:

$$U_1(x) = L(x) \cdot S(x + \Delta x) \tag{2}$$

Now, it is assumed that the white reference board 102 has no point at which the reflection factor is zero. Specifically, when $L(x) \neq 0$ is assumed, the ratio of $U_1(x)$ to $U_0(x)$ can be obtained independent of the function $L(x)$ of the white reference board 102. If the variation of shading noise of the sensing system is gradual, $U_1(x)/U_0(x)$ will be as follows:

$$\frac{U_1(x)}{U_0(x)} = \frac{S(x + \Delta x)}{S(x)} \approx \frac{S(x) + S'(x)\Delta x}{S(x)} = 1 + \frac{S'(x)}{S(x)} \Delta x \tag{3}$$

Thus, $$\frac{S'(x)}{S(x)} \Delta x = \frac{U_1(x)}{U_0(x)} - 1 \tag{4}$$

Therefore, S(x) can be obtained by the following equation:

$$S(x) = K \cdot \exp\left[\int \left(\frac{U_1(x)}{U_0(x)} - 1\right)\right] dx \tag{5}$$

where K represents a proportional constant, and S(x) represents the shading noise (variations in sensitivity) of the sensing system. Thus, the maximum of S(x) should be determined to be 1. If the amount of movement of the white reference board 102 is defined as one single pixel, S(x) will be as follows:

$$S(n) = K \cdot \exp\left[\sum_{m=1}^{n} \left(\frac{U_1(m)}{U_0(m)} - 1\right)\right] \tag{6}$$

where n represents the nth pixel. As described above, the true shading noise $S(x)$ (variations in sensitivity) of the sensing system can be obtained independent of variations in brightness of the white reference board 102. This $S(x)$ is stored in the line memory 113. When the white reference signal $U_0(x)$ expressed in the equation (1) is read for example, an output of the divider 115 will be as follows. In particular, only the true variations $L(x)$ in brightness of the white reference board can be obtained, and shading compensation is performed.

$$\frac{U_0(x)}{S(x)} = \frac{L(x) \cdot S(x)}{S(x)} = L(x) \quad (7)$$

In this state, when the original document 101 is sensed, the signals compensated for shading can be similarly obtained. Here, the ROM table 116 performs processing of the equation (4). The latch 118, adder 117, and ROM table 119 cooperatively perform processing of the equation (6).

Next, a second embodiment will be described. In the case where the change of shading noise of a sensing system (including variations in sensitivity of light sensors) is not gradual, errors appear in approximation of the equation (3). Now, the case of FIG. 2B is considered on the priority basis of the sensing system. Specifically, when it is assumed that a white reference board is moved and the sensing system is not moved, an output signal $U_2(x)$ thereof will be as follows:

$$U_2(x) = L(x + \Delta x) S(x) \quad (8)$$

If there is no portion at which the sensitivity of the sensing system becomes 0, the ratio of $U_0$ and $U_2$ can be obtained independent of variations in sensitivity of the sensing system. Further, if variations in brightness of the white reference board are gradual, the ratio of $U_2(x)$ to $U_0(x)$ can be expressed as follows:

$$\frac{U_2(x)}{U_0(x)} = \frac{L(x + \Delta X)}{L(x)} \approx \frac{L(x) + L'(x)\Delta x}{L(x)} = 1 + \frac{L'(x)}{L(x)} \Delta x \quad (9)$$

Thus, in the same manner as that when the equation (8) is obtained, true variations $L(x)$ in brightness of the white reference board can be obtained by use of the following equation:

$$L(n) = K \cdot \exp\left[\sum_{m-1}^{n} \left(\frac{U_1(m)}{U_0(m)} - 1\right)\right] \quad (10)$$

In order to obtain the shading noise of the sensing system from the thus obtained $L(x)$, $U_0(x)$ of equation (1) is divided by $L(x)$. Namely, the true shading noise of the sensing system can be obtained by the following equation:

$$\frac{U_0(x)}{L(x)} = \frac{L(x) \cdot S(x)}{L(x)} = S(x) \quad (11)$$

Figure 3:
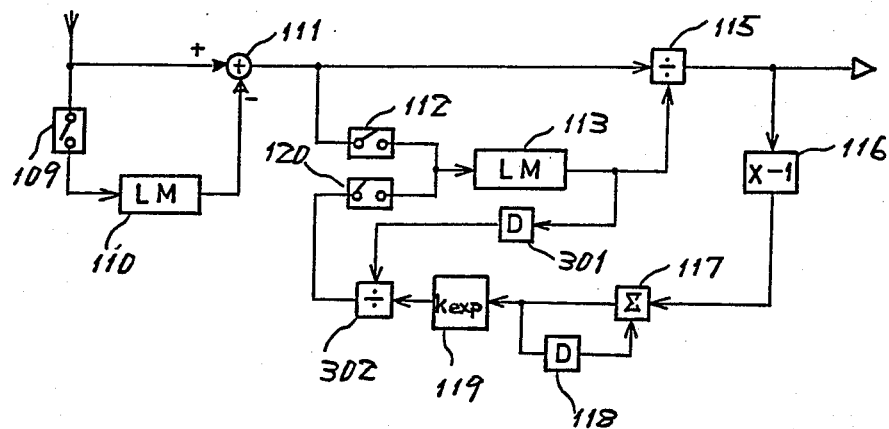
FIG. 3 is a block diagram illustrating a second embodiment of the present invention.

FIG. 3 shows a specific circuit configuration of the second embodiment. The configuration up to the AD converter 108 is identical with that of FIG. 1. Thus, the description thereof will be omitted. In this embodiment, only the function expressed by equation (11) is added to the functions in the embodiment of FIG. 1. Specifically, $U_{0x}$ which is stored in the line memory 113 is stored in a latch 301. This $U_{0x}$ is divided by the output $L(x)$ from the table 119, so as to obtain $S(x)$. This division of equation (11) is executed by use of a divider 302. Next, the gate switch 120 is turned ON, and the thus obtained $S(x)$ is stored in the line memory 113. As a result, the shading compensation can be performed independent of dirtiness of the white reference board in the same manner as that in the embodiment of FIG. 1.

In this embodiment, stable shading compensation can be achieved even when the change of the shading noise of the sensing system is not gradual.

Figure 4:
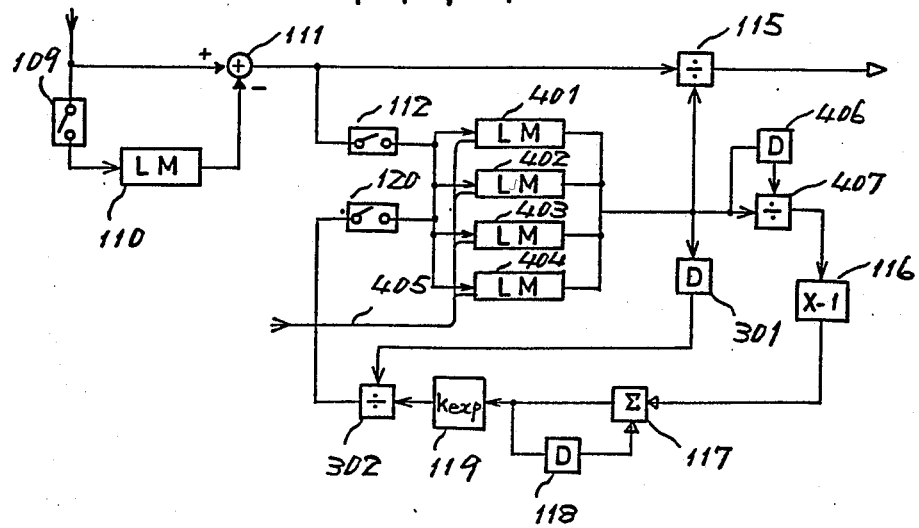
FIG. 4 is a block diagram illustrating a third embodiment of the present invention.

Next, a third embodiment will be described with reference to FIG. 4. In the first embodiment of FIG. 1, when the white reference board is conspicuously dirtied and variations in brightness of the board is not gradual, errors become greater in approximation of equation (9). In the third embodiment, therefore, the amount of the movement $\Delta x$ of the white reference board is determined to be $1/n$ of one single pixel, and the board moves n times. The signals corresponding to each movement are stored and defined as $U_{2x}$, and errors become smaller in approximation of the equation (9). The third embodiment differs from the first embodiment in terms of $\Delta x$, which is one single pixel in the first embodiment. In the third embodiment of FIG. 4, the white reference board is moved n times, each time by the amount of $1/n$ of one single pixel. Thus, stable shading compensation can be achieved even when the white reference board is conspicuously dirtied and the change of the white reference signal $L(x)$ is not gradual. Specifically, by using the actuator 103 of FIG. 1, the white reference board 102 is moved each time by $\frac{1}{4}$ of one single pixel. After every movement of the white reference board, the signals of $S(x)$ are respectively stored into line memories 401, 402, 403, and 404 under the control made by a memory control line 405. Next, signals adjoining to each other on the white reference board 102 are read respectively from the line memories 401, 402, 403 and 404 under the control made by the memory control line 405. The thus read signals are temporarily stored in a latch 406. Thereafter, processing of the equation (9) is executed by a divider 407. The procedures other than these are performed in the same manner as those in FIG. 3.

In this embodiment, the stable shading compensation can be achieved even when the shading noise of the sensing system (variations in sensitivity of the light sensors) is large, or when the white reference board is significantly dirtied, or when variations in brightness of the board are steep.

Next, a fourth embodiment will be described with reference to FIG. 5. In the first embodiment of FIG. 1, the original document 101 is sensed by scanning on the basis of the black level signals stored within the line memory 110 and the white level signals stored within the line memory 113. In this case, if noises appear in these signals, stripe-pattern noises occasionally occur throughout the area facing the original document 101. Therefore, in this fourth embodiment of FIG. 5, black level signals and white level reference signals are obtained by sensing a plural number of times. This reduces the effect of electrical noises on the sensing system.

Further in this embodiment, there is also provided a circuit configuration to cope with the case where color images are sensed. Here, the description up to the AD converter 108 in FIG. 1 is also omitted in the same manner as that in the previous embodiments. However, the light sensors 106 in this embodiment are constituted by color sensors provided with filters of colors such as red (R), green (G), and blue (B).

Figure 5:
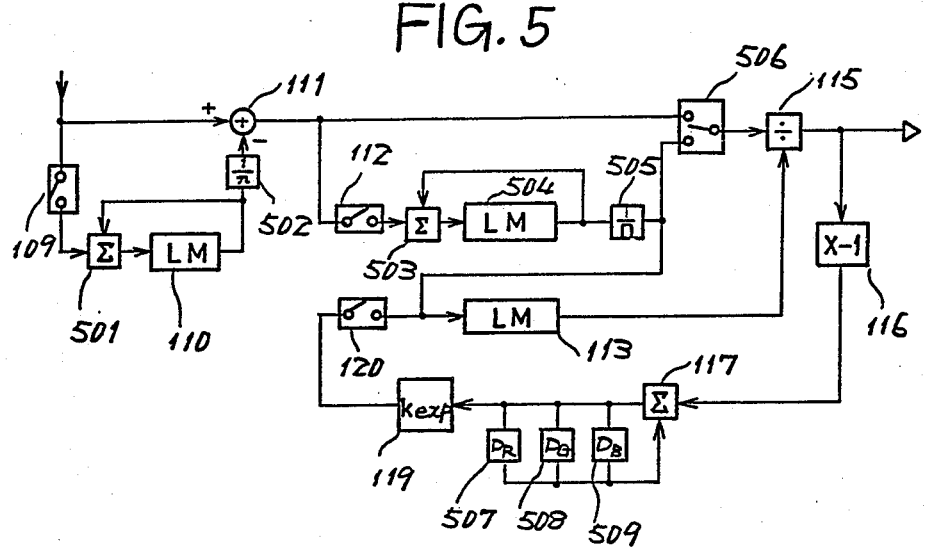
FIG. 5 is a block diagram illustrating a fourth embodiment of the present invention.

In FIG. 5, a gate switch 109 is turned ON, and black level signals are fed into an adder 501. Then the signals are stored in a line memory 110. Next, one single line of the original document is sensed, and the thus sensed data are added to the contents stored in the line memory 110. Then, the thus added signals are stored in the line memory 110. These operations are repeatedly performed so as to obtain the accumulated result. This result is fed into a table 502 in which the result is divided by the number of additions, so as to obtain an average value, whereby the noise effect is reduced.

Here, if the additions are performed n times (n represents the n in 2 to the nth power), the connection of the table 502 could be altered. The output of the line memory 110 is shifted by a predetermined amount and then fed into the adder 111. Next, white reference levels are similarly sensed. Namely, by the use of an adder 503 and a line memory 504, the white reference board is sensed a plural number of times. Thereafter, average values are obtained by a division table 505 so as to reduce electrical noise. These average data are stored in a line memory 113. Next, the white reference board is moved and the board is sensed a plural number times. The thus sensed values are stored in the line memory 504. The data before and after the movement of the white reference board are respectively stored in the line memory 113 and the line memory 504. Thus, a selector 506 receives the contents of the line memory 504, and feeds the same into a divider 115 together with the contents of the line memory 113. The divider 115 performs the processing in the same manner as that in the previous embodiments.

However, in this embodiment, the light sensors 106 are constituted by color light sensors provided with filters of colors such as R, G and B. The ratios of the data before and after movement of the white reference board are obtained by the divider 115 with respect to the individual color light sensors. Thus, the respective ratios are separately obtained in terms of respective color signals. Therefore, particular care to cope with color discrimination is unnecessary. However, when Σ of the equation (6) is obtained, it is necessary to respectively obtain the sums of values of identical colors. Therefore, independent latches such as 507, 508 and 509 are provided to separately store individual color signals of R, G and B. This configuration can cope with color discrimination. The procedures other than the above-mentioned are all the same as those in the first embodiment of FIG. 1. As described above, in this embodiment, the effects of electrical noise can be reduced while the reference signals are sensed. Thus, the image sensing system is not affected by the electrical noises of the optical system. Therefore, image sensing with extremely low noise can be realized.

Figure 6A:
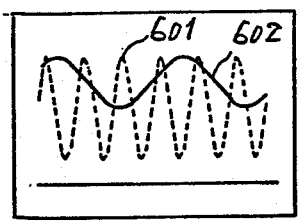
FIGS. 6A through 6C are waveform diagrams for explaining the operation of the present invention.
Figure 6B:
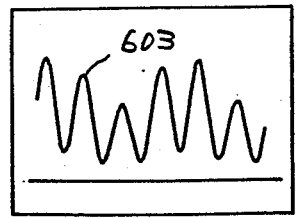
Figure 6C:
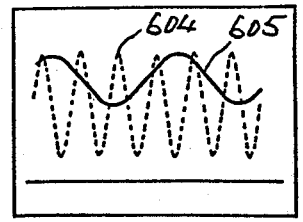

Here, the specific waveforms of the signals obtained after the above-described shading compensation will be explained. In FIG. 6A, the dotted line 601 represents a shading noise S(x) including variations in sensitivity of the sensing system. The solid line 602 represents variations L(x) in brightness of the white reference board. In FIG. 6B, the solid line 603 represents the output signal U(x) from the sensors 106. When the white reference board is moved by the amount of one single pixel of the sensor 106, the signal waveform from the sensors 106 is substantially the same as that shown in FIG. 6B. FIG. 6C shows the waveforms obtained after separation of the shading noise and variations in brightness of the white reference board. Specifically, the dotted line 604 represents the shading noise S(x), and the solid line 605 represents variations L(x) in brightness of the white reference board.

As described above, in this embodiment, the shading noise of the sensing system can be obtained independent of variations in brightness of the white reference board.

As can be seen in FIG. 6C, according to the present invention, the variations in brightness of the true input can be directly obtained independent of the shading noise of the sensing system. This can be achieved by processing of the equation (10).

Next, a fifth embodiment will be described with reference to FIG. 7. This embodiment shows an example of an application of the invention to a stomach camera using a two-dimensional sensor. In a stomach camera, the optical system is subject to accumulation of foreign substances and the degree of such accumulation constantly changes. Thus, the previous embodiments in which the shading noise is obtained and stored in the memory, and then used for computing shading compensation may not be advantageous. Therefore, in this embodiment, an arrangement is employed in which variations in brightness of a subject are directly obtained independently of the shading noise.

Figure 7:
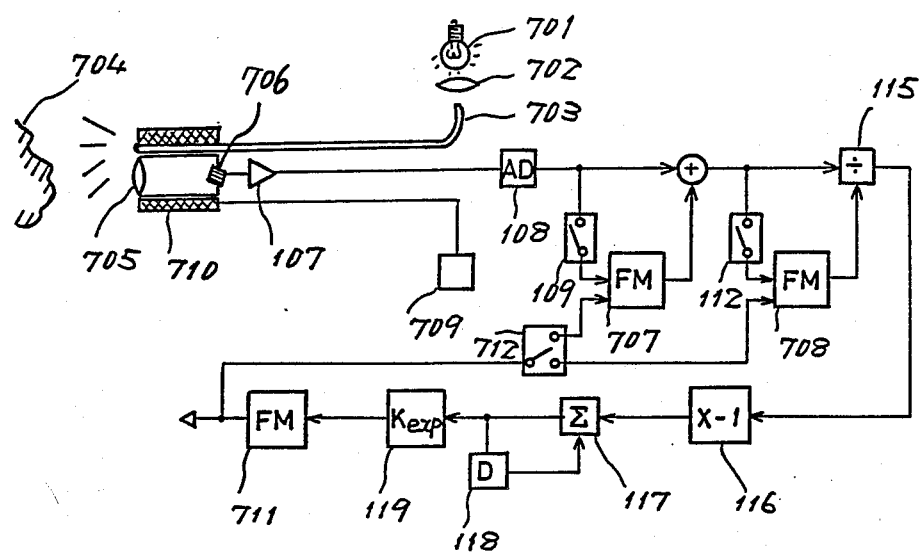
FIG. 7 is a block diagram illustrating a fifth embodiment.

In FIG. 7, light from a light source 701 is led through a focusing lens 702 into an optical guide fiber 703. The light led into the optical guide fiber 703 is applied to a subject 704 for photography. The image of the subject 704 is then focused on a two-dimensional sensor 706 by a focusing lens 705. Electrical signals derived from the two-dimensional sensor 706 are amplified by an amplifier 107, and then fed into an AD converter 108 through a cable. Thereafter, the procedures are performed in the same manner as those in the first embodiment of FIG. 1, except the following description. Specifically, in place of the line memories 110 and 113 in the first embodiment, frame memories 707 and 708 are used.

Here, a clock signal generated by a clock generator 709 is fed into an actuator 710 for each image frame. The actuator 710 causes an optical system constituted by an optical fiber 703, a lens 705 and light sensors 706 to move by the amount of one single pixel, so as to receive image data. The image data are processed by the use of the equation (10) in the same manner as in the second embodiment. In accordance with these procedures, images can be obtained without the shading noise (variations in brightness depending on the lens and the illumination system).

An example of the specific shading compensation in terms of two dimensions will be described hereinafter. In this embodiment, image data of two frames which are shifted by the amount of one single pixel in the vertical direction and shading-compensated in the horizontal direction are obtained. The image data create an image which is shading-compensated in two dimensions (in the horizontal and vertical directions). Specifically, first, the actuator 710 causes the above-described optical system to move only in the horizontal direction and the procedure executes the processing of the equation (10) in the same manner as that in the second embodiment. As a result, an image which is shading-compensated in the horizontal direction can be obtained from a data conversion table 119. This image is stored in a frame memory 711.

Next, the actuator 710 causes the above-described optical system to move in the vertical direction by the amount of one single pixel, further in the horizontal direction. Thereafter, the shading compensation in the horizontal direction is performed using the data before and after the movement in the horizontal direction in the same manner as that in the second embodiment. The image obtained from this procedure is stored in the frame memory 711, while at the same time the data stored in the frame memory 711 are transferred to the frame memory 707 through a gate switch 712. As a result, the images which are shifted with each other by the amount of one single pixel in the vertical direction and shading-compensated in the horizontal direction are stored in the frame memories 707 and 711. Thereafter, the data stored in the frame memory 711 are transferred to the frame memory 708 through the gate switch 712. The images are read from the data stored in the frame memories 707 and 708 in the vertical direction and the shading compensation is performed. As a result, the images which are shading-compensated in both the horizontal and vertical directions are obtained in the frame memory 711.

In all the above-described embodiments, it is necessary to move the object or the optical system by the amount of precisely one single pixel or 1/n times the pixel. However, this position control is not necessarily easy to perform. Thus, a mark is attached on the periphery of the white reference board 102 so as to cope with this difficulty. When the actuator 103 causes the white reference board 102 to move, the mark attached on the board 102 is sensed so as to confirm the amount of movement, which is the amount of one single pixel. Thereafter, the data are sensed and processed in the same manner as in the previous embodiments.

Moreover, a position sensor is attached on the actuator 103 or the white reference board 102 so as to monitor the amount of movement of the board 102. Control is such that when the board 102 is moved by the amount of precisely one single pixel, the data are read and processed in the same manner as in the previous embodiments.

Furthermore, a position sensor is attached on the actuator 103, and position signals generated by the position sensor are fed back to the actuator 103. Thus, the white reference board 102 is controlled to move by the amount of precisely one single pixel.

As described above, according to the present invention, even when an object (a white reference board) is not uniform in brightness, precise shading noises of an image sensing system can be obtained from signals before and after the movement of the object or the image sensing system by a constant amount. In addition, the thus obtained shading noises are stored in memories, whereby an accurate shading compensation can be performed.

Further, an image sensing and processing can be performed independent of shading noises of the image sensing system.

Obviously, numerous additional modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. An image sensing apparatus with shading compensation comprising:
    means for optically sensing an image of an object by use of light sensors including a plurality of light sensing elements,
    means for relatively moving said object and said sensing means,
    processing means for obtaining shading compensation information by use of image signals sensed with different light sensing elements from the same point of said object before and after movement thereof performed by said moving means, and
    means for storing the thus obtained shading compensation information.

2. The image sensing apparatus with shading compensation according to claim 1, wherein said object includes a white reference board and an original document to be sensed.

3. The image sensing apparatus with shading compensation according to claim 2, wherein said moving means includes a first moving means for moving said white reference board, and a second moving means for said original document.

4. The image sensing apparatus with shading compensation according to claim 3, wherein the directions of movements performed by said first moving means and said second moving means intersect perpendicularly to each other.

5. The image sensing apparatus with shading compensation according to claim 1, wherein said light sensing elements for sensing the same point of said object are disposed adjoining each other.

6. The image sensing apparatus with shading compensation according to claim 1, wherein said optical sensing means includes at least a light source, focusing elements and light sensors and wherein the light source illuminates the object and the focusing elements focus an image of the illuminated object on the light sensors.

7. The image sensing apparatus with shading compensation according to claim 1, wherein the image of said object is sensed before and after said object is moved in a direction in which said light sensing elements are arranged at a given pitch by a predetermined distance which is 1/n times a separation distance corresponding to the pitch of said light sensing elements.

8. The image sensing apparatus with shading compensation according to claim 7, wherein said object is a white reference board.

9. An image sensing apparatus with shading compensation, comprising:
    a movable white reference board capable of being moved by an actuator by one single pixel;
    a light source for applying light to said white reference board;
    a line light sensor having a plurality of light sensing elements arranged corresponding to respective pixels, for sensing light reflected from said white reference board;
    an AD converter for converting output signals from said line light sensor into digital signals;
    memory means for storing digital signals from said AD converter converted from output signals produced by the line light sensor before the white reference board is moved;
    a divider for calculating a ratio of the digital signals stored in said memory means and digital signals from the AD converter converted from output signals produced by the line light sensor after said white reference board is moved by one single pixel by the actuator; and
    ROM means for converting output signals from said divider into shading compensation information.

* * * * *